US008115090B2

(12) United States Patent
Miyajima et al.

(10) Patent No.: US 8,115,090 B2
(45) Date of Patent: Feb. 14, 2012

(54) MASHUP DATA FILE, MASHUP APPARATUS, AND CONTENT CREATION METHOD (75) Inventors: Yasushi Miyajima, Kanagawa (JP); Yoichiro Sako, Tokyo (JP)

(73) Assignee: Sony Corporation (JP)

( * ) Notice: Subject to any disclaimer, the term of this patent is extended or adjusted under 35 U.S.C. 154(b) by 80 days.

(21) Appl. No.: 12/312,947

(22) PCT Filed: Oct. 9, 2007

(86) PCT No.: PCT/JP2007/069680
§ 371 (c)(1),
(2), (4) Date: May 28, 2009

(87) PCT Pub. No.: WO2008/065808
PCT Pub. Date: Jun. 5, 2008

(65) Prior Publication Data
US 2010/0064882 A1 Mar. 18, 2010

(30) Foreign Application Priority Data
Nov. 28, 2006 (JP) ................... 2006-319641

(51) Int. Cl.
G10H 1/08 (2006.01)
G10H 7/00 (2006.01)
(52) U.S. Cl. .................................................... 84/625
(58) Field of Classification Search .................. 84/625
See application file for complete search history.

(56) References Cited

U.S. PATENT DOCUMENTS

| 7,080,016 | B2 | 7/2006 | Miyashita et al. |
| 7,626,112 | B2 * | 12/2009 | Miyajima ........................ 84/609 |
| 7,716,572 | B2 * | 5/2010 | Beauregard et al. ........... 715/223 |
| 7,777,121 | B2 * | 8/2010 | Asano ............................. 84/600 |

(Continued)

FOREIGN PATENT DOCUMENTS
JP 07-006512 1/1995
(Continued)

OTHER PUBLICATIONS
Office Action from Japanese Application No. 2006-319641, dated Jun. 28, 2011.

Primary Examiner — Jeffrey Donels
(74) Attorney, Agent, or Firm — Lerner, David, Littenberg, Krumholz & Mentlik LLP (57) ABSTRACT There are provided recording means for recording first data (12A) or (12B) used for dividing each of a first piece of content and a second piece of content into a plurality of blocks in accordance with each piece of contents and recording means (11A) or (11B) for recording second data indicating a sequence for arranging the plurality of blocks to create a new piece of content. The first piece of content and the second piece of content are mashed up using the first data and the second data, and a result of mashup processing is output. As a result, it is possible to mash up the first piece of content and the second piece of content without special knowledge.

5 Claims, 12 Drawing Sheets

U.S. PATENT DOCUMENTS

| | | | |
|---|---|---|---|
| 2006/0054005 A1 | 3/2006 | Miyajima et al. | |
| 2006/0263037 A1* | 11/2006 | Gilley | 386/52 |
| 2006/0265657 A1* | 11/2006 | Gilley | 715/730 |
| 2007/0300258 A1* | 12/2007 | O'Connor et al. | 725/44 |
| 2008/0016114 A1* | 1/2008 | Beauregard et al. | 707/104.1 |
| 2008/0059989 A1* | 3/2008 | O'Connor et al. | 725/9 |
| 2008/0127812 A1* | 6/2008 | Sako et al. | 84/625 |
| 2008/0259745 A1 | 10/2008 | Sako et al. | |
| 2009/0019995 A1* | 1/2009 | Miyajima | 84/625 |
| 2009/0158238 A1* | 6/2009 | Jung et al. | 717/100 |
| 2009/0204594 A1* | 8/2009 | Akkiraju et al. | 707/5 |
| 2009/0287987 A1* | 11/2009 | Alles et al. | 715/203 |
| 2010/0125826 A1* | 5/2010 | Rice et al. | 717/107 |
| 2010/0209003 A1* | 8/2010 | Toebes et al. | 382/209 |

FOREIGN PATENT DOCUMENTS

| | | |
|---|---|---|
| JP | 2001257967 A | 9/2001 |
| JP | 2003-108132 | 4/2003 |
| JP | 2004-269085 A | 9/2004 |
| JP | 2005-020202 | 1/2005 |
| JP | 2006-030538 | 2/2006 |
| JP | 2006-047644 | 2/2006 |
| JP | 2006-084748 | 3/2006 |
| JP | 2006-107693 | 4/2006 |
| JP | 2006-337914 | 12/2006 |
| WO | 2006114998 A1 | 11/2006 |

* cited by examiner

Xxx Carey
Xxx Be My Baby (79.931 BPM 84 bars) } 13A

| Intro | | | | | | | | A | | | | |
|---|---|---|---|---|---|---|---|---|---|---|---|---|
| VIm7 (D#m7) | II7 (G#7) | VM7 (C#M7) | VIM7 (F#M7) | II7 (G#7) | Vm7 (C#7) | IM7 (F#M7) | V7 (C#7) | IM7 (F#M7) | VIm7 (D#m7) | IIm7 (G#7) | Vm7 (C#7) | IM7 (F#M7) |

| 11A → | BLK_A1 | BLK_A2 | BLK_A3 | BLK_A4 | ⋯ |
| 11B → | BLK_B1 | BLK_B2 | BLK_B3 | BLK_B4 | ⋯ |

MASHUP DATA FILE, MASHUP APPARATUS, AND CONTENT CREATION METHOD

CROSS-REFERENCES TO RELATED APPLICATIONS

The present application is a national phase entry under 35 U.S.C. §371 of International Application No. PCT/JP2007/069680 filed Oct. 9, 2007, published on Jun. 5, 2008 as WO 2008/065808 A1, which claims priority from Japanese Patent Application No. JP 2006-319641 filed in the Japanese Patent Office on Nov. 28, 2006.

TECHNICAL FIELD

The present invention relates to a mashup data file, a mashup apparatus, and a content creation method.

BACKGROUND ART

Processing for overlaying parts or all of a plurality of music pieces is called remixing. The types of remixing include "mashup" processing in which more sophisticated processing is performed. In the mashup processing, for example, when a music piece A and a music piece B are remixed, a new music piece is created by making the tempos of both of these music pieces (the speeds at which these music pieces are played), the numbers of beats (for example, the numbers of quarter notes) of both of these music pieces, the keys (the pitches of essential notes, such as C major or D minor) of both of these music pieces, and the chord progressions (chord changing states) of both of these music pieces conform to each other, and cutting and pasting only appropriate portions of these music pieces.

Not only a person who created a music piece by performing the mashup processing but also the person's friend sometimes enjoys listening to the music piece.

Related art documents include, for example, Japanese Unexamined Patent Application Publication No. 2006-107693.

DISCLOSURE OF INVENTION

However, only some users who are very familiar with music can perform mashup processing.

Furthermore, a new music piece created by mashing up original music pieces may infringe the copyrights of the original music pieces.

The present invention addresses the above-described problems.

The present invention provide a mashup data file used for mashing up at least a first piece of content and a second piece of content. The mashup data file includes: first data used for dividing each of the first piece of content and the second piece of content into a plurality of blocks in accordance with each piece of contents; and second data indicating a sequence for arranging the plurality of blocks to create a new piece of content.

According to the present invention, it is possible to perform mashup processing without special knowledge for mashup processing. Furthermore, it is possible to reprocess or develop a result of the mashup processing.

In that case, users who will listen to a mashup music piece, which is the result of mashup processing, prepare original music pieces. The prepared original music pieces are simply reproduced in accordance with a recipe. Accordingly, the possibility that the infringement of copyrights of the original music pieces will occur is low.

BEST MODES FOR CARRYING OUT THE INVENTION

[1] Overview of Display Example

Figure 1:
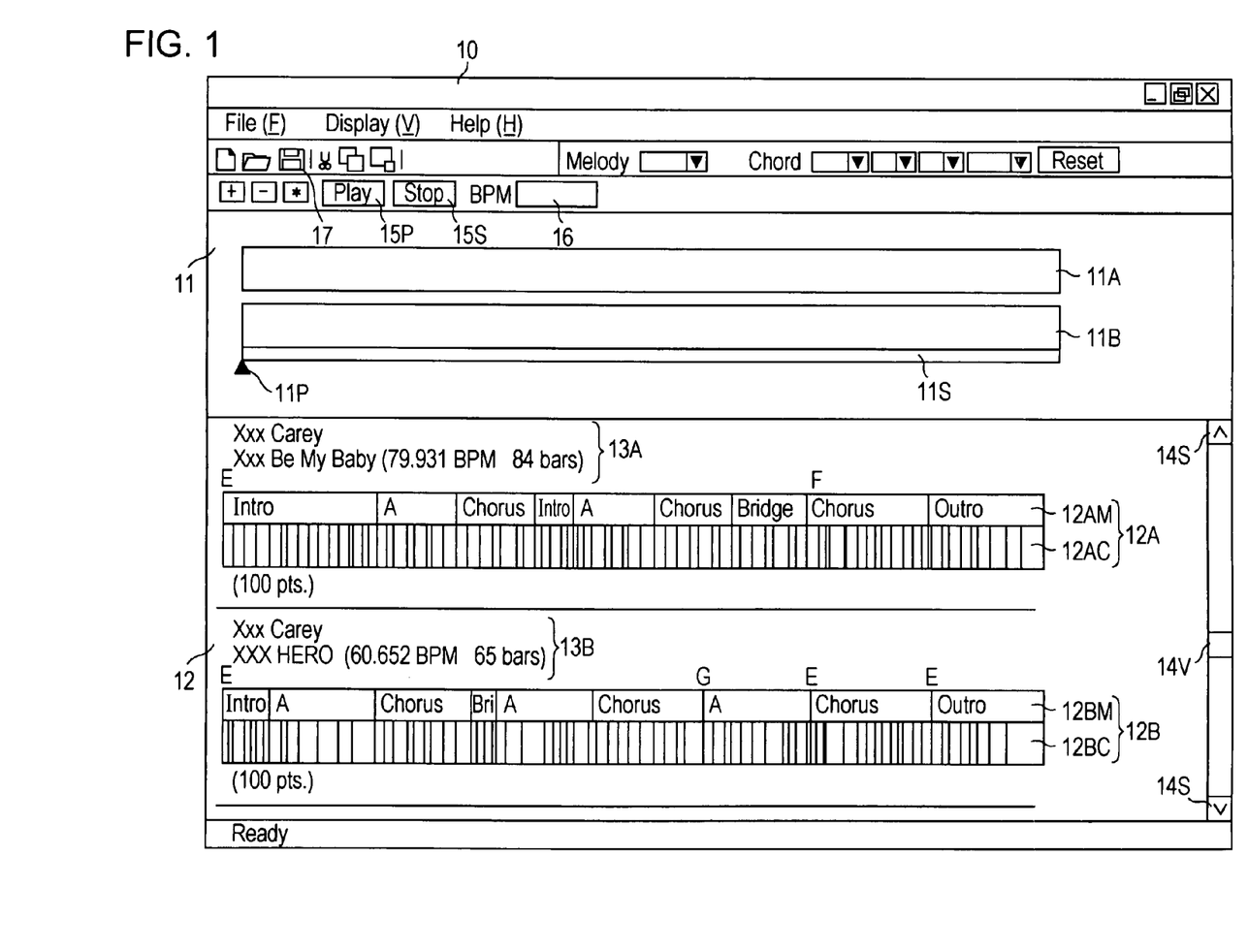
FIG. 1 is a diagram illustrating a display screen according to an embodiment of the present invention.
Figure 2:
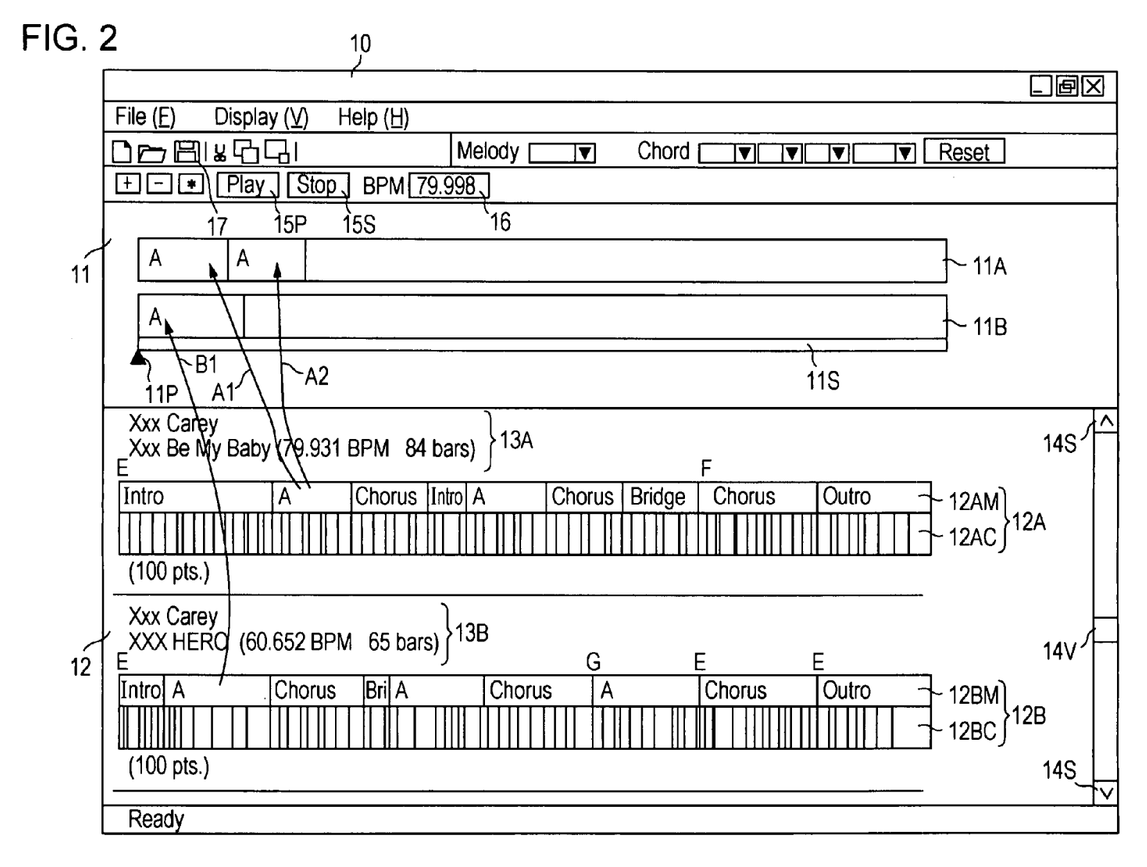
FIG. 2 is a diagram illustrating a display screen according to an embodiment of the present invention.
Figure 3:
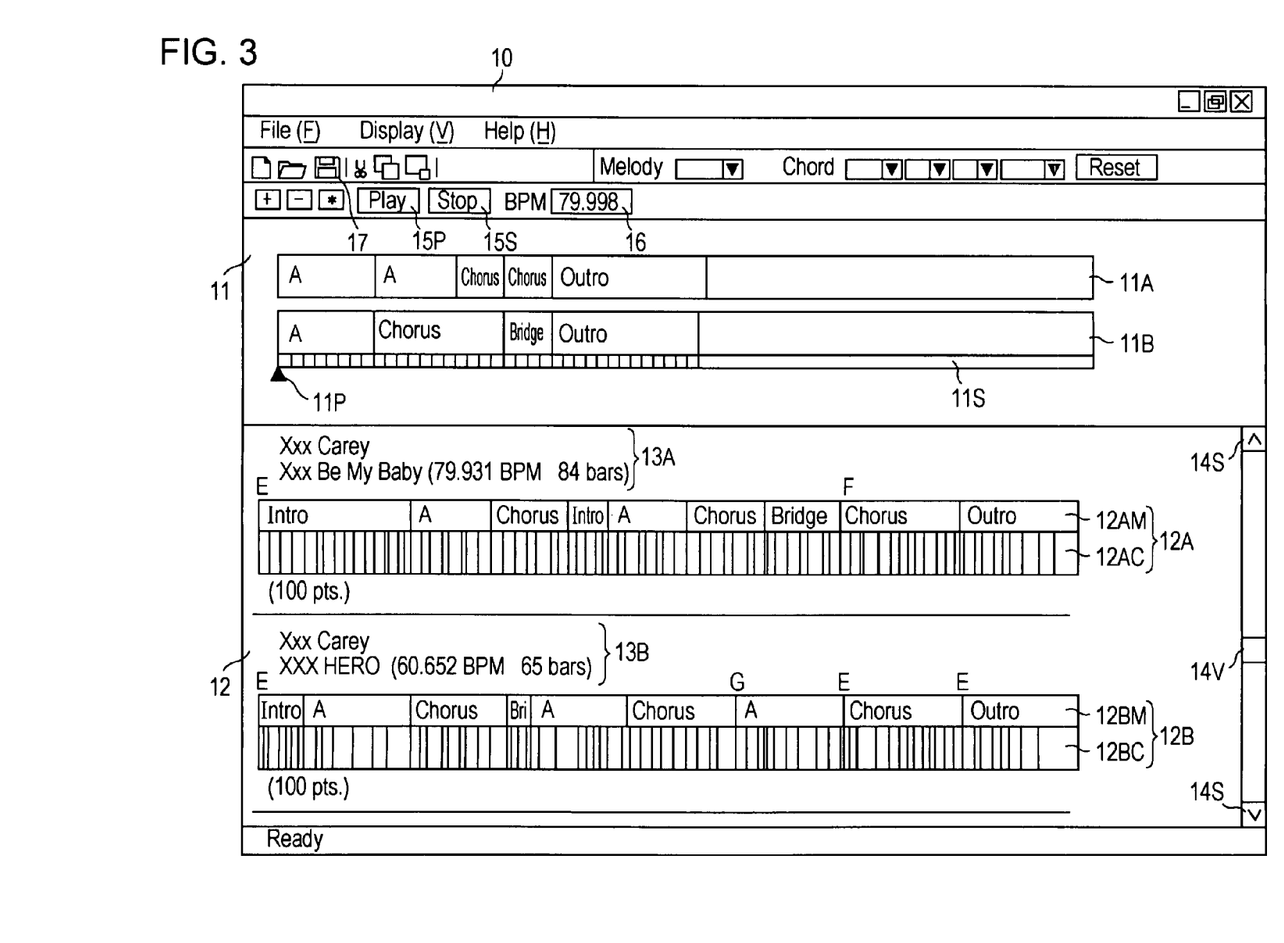
FIG. 3 is a diagram illustrating a display screen according to an embodiment of the present invention.

FIGS. 1 to 3 illustrate display examples of a display screen in a case where mashup processing according to the present invention is performed. In these examples, a personal computer performs mashup processing so as to create a new music piece from two music pieces, music pieces A and B. However, the mashup processing may be performed using three music pieces or more. Sections such as an introduction (intro), a verse A, a verse B, a chorus, a bridge, and an ending (outro) into which a music piece can be separated are hereinafter referred to as "blocks".

In FIGS. 1 to 3, a reference numeral 10 represents a display screen when mashup processing is performed. FIG. 1 illustrates a screen when mashup processing is started, FIG. 2 illustrates a screen while the mashup processing is being performed, and FIG. 3 illustrates a screen when the mashup processing has finished.

The display screen 10 is divided into two areas, an upper area 11 and a lower area 12. In the upper area 11, information about a result of mashup processing is displayed. In the lower area 12, pieces of information about the original music pieces (music pieces) A and B to be used for mashup processing are displayed.

Accordingly, the upper area 11 is provided with a strip area 11A in which a block of the original music piece A is to be copied and a strip area 11B in which a block of the original music piece B is to be copied. The tracks 11A and 11B are provided in the area 11 so that they are parallel to each other and the horizontal direction is a time axial direction. The areas 11A and 11B are hereinafter referred to as tracks 11A and 11B, respectively, in a similar manner to tracks of a magnetic tape.

Furthermore, at the bottom of the track 11B, a performance time scale 11S is displayed. At the starting position of the performance time scale 11S, a pointer 11P indicating a performance time position is displayed.

Still furthermore, a stripe track 12A indicating information about the original music piece A and a stripe track 12B indicating information about the original music piece B are formed in the area 12 so that they are parallel to each other and the horizontal direction is a time axial direction. FIG. 1 illustrates an initial screen on which the pieces of information about the original music pieces A and B are provided in the tracks 12A and 12B, respectively (when these pieces of information are not provided, they are empty like the tracks 11A and 11B).

Figure 4:
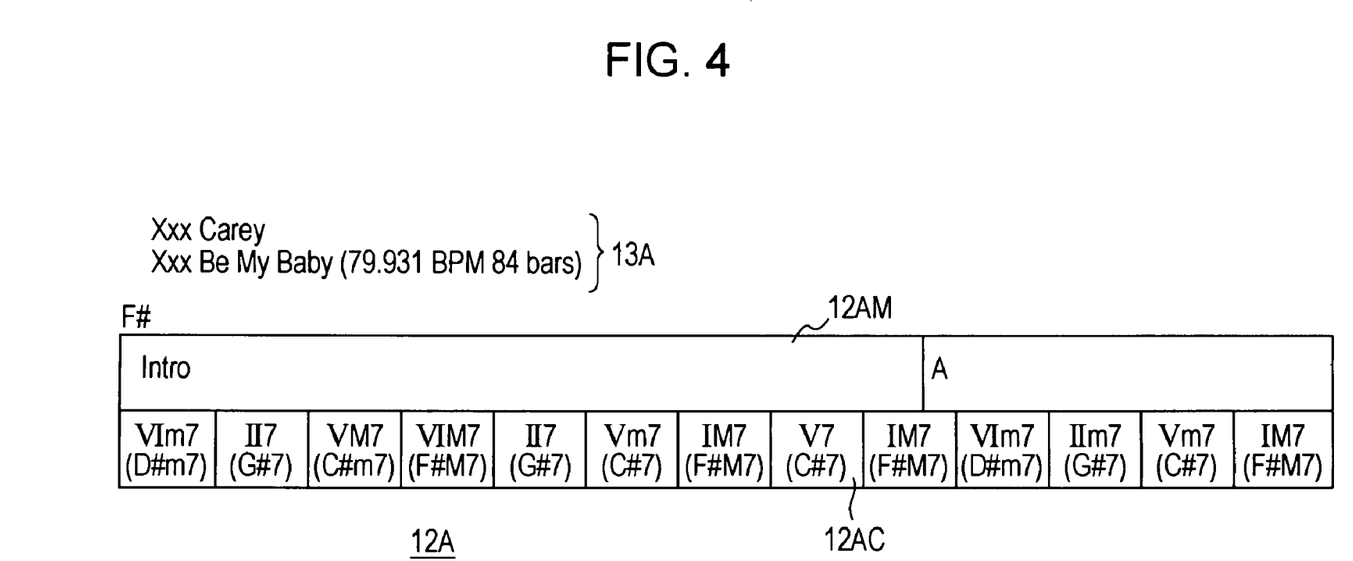
FIG. 4 is an enlarged view of a display example.

In this case, the track 12A is divided into two tracks, an upper track 12AM called "melody track" and a lower track 12AC called "chord track". The melody track 12AM is separated into blocks of the original music piece A, that is, an introduction, a verse A, a verse B, a chorus, a bridge, an ending (outro), etc. Each of these blocks is provided with data of a corresponding melody. Furthermore, as illustrated in FIG. 4 in such a manner that the time axis (in the horizontal direction) is enlarged, the chord track 12AC is separated into blocks in accordance with the chord progression of the original music piece A. Each of these blocks is provided with data of a corresponding chord.

Still furthermore, the track 12B has the same structure as that of the track 12A. A melody track 12BM is separated into blocks of the original music piece B, and each of these blocks is provided with data of a corresponding melody. A chord track 12BC is separated into blocks in accordance with the chord of the original music piece B, and each of these blocks is provided with data of a corresponding chord.

Furthermore, as indicated by reference numerals 13A and 13B, the artist names, titles, tempos, and bar numbers of the original music pieces A and B are displayed on the upper sides of the tracks 12A and 12B, respectively. If there are three original music pieces or more, the tracks of all of these original music pieces, for example, the tracks 12A and B, etc., can be used by operating a scroll button 14S or a scroll bar 14V, which is displayed on the right-hand side of the area 12, using a mouse to scroll through the area 12 in the vertical direction.

Incidentally, even if the time length of the tracks 12AM and 12AC differs from that of the tracks 12BM and 12BC in reality, they are displayed as having the same standardized time length. Each block included in these tracks is displayed with a color corresponding to contents of the block. Furthermore, the pieces of digital audio data of the original music pieces A and B and the pieces of information to be displayed in the tracks 12A and 12B are obtained, for example, via a download site, the Internet, or the like, and are then provided on a personal computer in advance.

Furthermore, at the top of the display screen 10, a reproduction button 15P used to perform test-listening of the progress or result of mashup processing, a stop button 15S used to stop the reproduction of the progress or result of mashup processing, an input field 16 used to specify a reproduction tempo, a save button 17 used to store information about a result of mashup processing, etc. are displayed.

[2] Mashup Processing Method

In a display state illustrated in FIG. 1, for example, if the "verse A" included in the melody track 12AM of the original music piece A is dragged and dropped or is copied and pasted at the beginning of the track 11A as indicated by an arrow A1 in FIG. 2, the "verse A" of the original music piece A is copied to the beginning of the track 11A. Referring to FIG. 2, as indicated by an arrow A2, the "verse A" is repeatedly copied to the track 11A.

Furthermore, as indicated by an arrow B1 in FIG. 2, the "verse A" included in the melody track 12BM of the original music piece B is dragged and dropped or is copied and pasted at the beginning of the track 11B, the "verse A" of the original music piece B is copied to the beginning of the track 11B.

Subsequently, by performing an operation similar to the above-described operation, a predetermined block included in any one of the blocks 12AM to 12BC is copied to the track 11A or 11B. As a result, for example, the tracks 11A and 11B can have data as illustrated in FIG. 3.

Subsequently, if a user clicks on the reproduction button 15P, a music piece created in the track 11A and a music piece created in the track 11B are mixed and are then reproduced. Accordingly, the user can test-listen to a mashup music piece.

Note that, in the reproduction of the music piece that is a mashup processing result, the digital audio data itself of the mashup processing result is not reproduced. The blocks of the original music pieces A and B are selectively extracted or processed in real time on the basis of the pieces of data displayed in the tracks 11A and 11B and are then reproduced.

If the user is not satisfied with the mashup music piece, the user can delete, copy, or move a corresponding block included in the track 11A or 11B using a mouse and also can copy a new block from any one of the tracks 12AM to 12BC to the track 11A or 11B. That is, the tracks 11A and 11B can be individually edited on a block-by-block basis.

Thus, by performing the copying of blocks from the tracks 12AM to 12BC to the tracks 11A and 11B, the editing of the tracks 11A and 11B, and the test-listening of the result of these processing operations, the user can obtain a desired mashup music piece that is a result of mashup processing.

If the user clicks on the save button 17 after the creation of a new mashup music piece has been completed, instead of the digital audio data itself of the mashup music piece that is a result of mashup processing, information required to reproduce the mashup music piece (the pieces of data displayed in the tracks 11A and 11B) is stored in a large-capacity storage included in a personal computer, for example, a hard disk drive. That is, information indicating the original music piece A, information indicating the original music piece B, pieces of information about blocks of the original music pieces A and B to be used for mashup processing, pieces of information about the time positions and chronological sequences of the blocks at the time of use of the blocks, information about the tempos of the blocks, etc. are stored in the hard disk drive as a file.

Incidentally, in a case where a meal is cooked, food items are prepared in accordance with a recipe and are then cooked using a procedure and a method which are indicated by the recipe. The above-described mashup processing method is similar to cooking. Accordingly, information required for mashup processing (in the above-described case, information stored in the hard disk drive) is hereinafter referred to as a "recipe". That is, pieces of digital audio data of music pieces and pieces of metadata of the music pieces are prepared in accordance with a recipe, and are then edited using a procedure and a method which are indicated by the recipe. Consequently, a mashup music piece is created.

[3] Reproduction of Mashup Music Piece

In this case, the pieces of digital audio data of the target original music pieces A and B and a recipe file are prepared in a personal computer. If a program for the recipe is executed, the original music pieces A and B are automatically processed in accordance with the recipe, that is, on the basis of the tracks 11A and 11B illustrated in FIG. 1, and a mashup music piece is output as sound.

Figure 5:
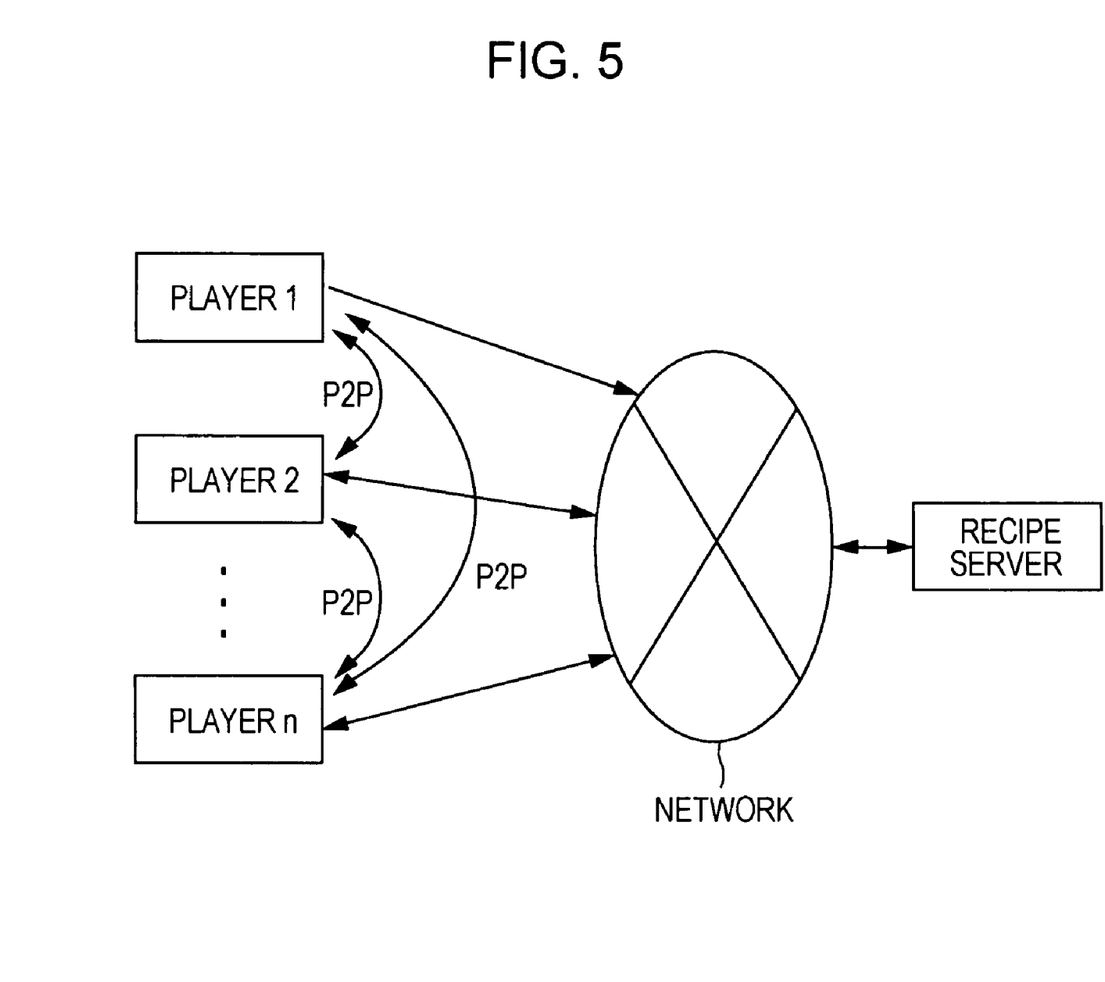
FIG. 5 is a diagram illustrating an application example.

Accordingly, for example, as illustrated in FIG. 5, if this recipe is distributed among a plurality of n players (users) via a P2P network or is distributed from a server, a homepage, or the like to the n players (users) via a network, the users that have received the recipe can listen to a mashup music piece. In that case, the users that will listen to the mashup music piece prepare the original music pieces A and B. The prepared original music pieces A and B are simply reproduced in accordance with the received recipe. Accordingly, the possibility that the infringement of copyrights of the original music pieces A and B will occur is low. Conversely, this can contribute to the sales of the original music pieces A and B.

Figure 6:
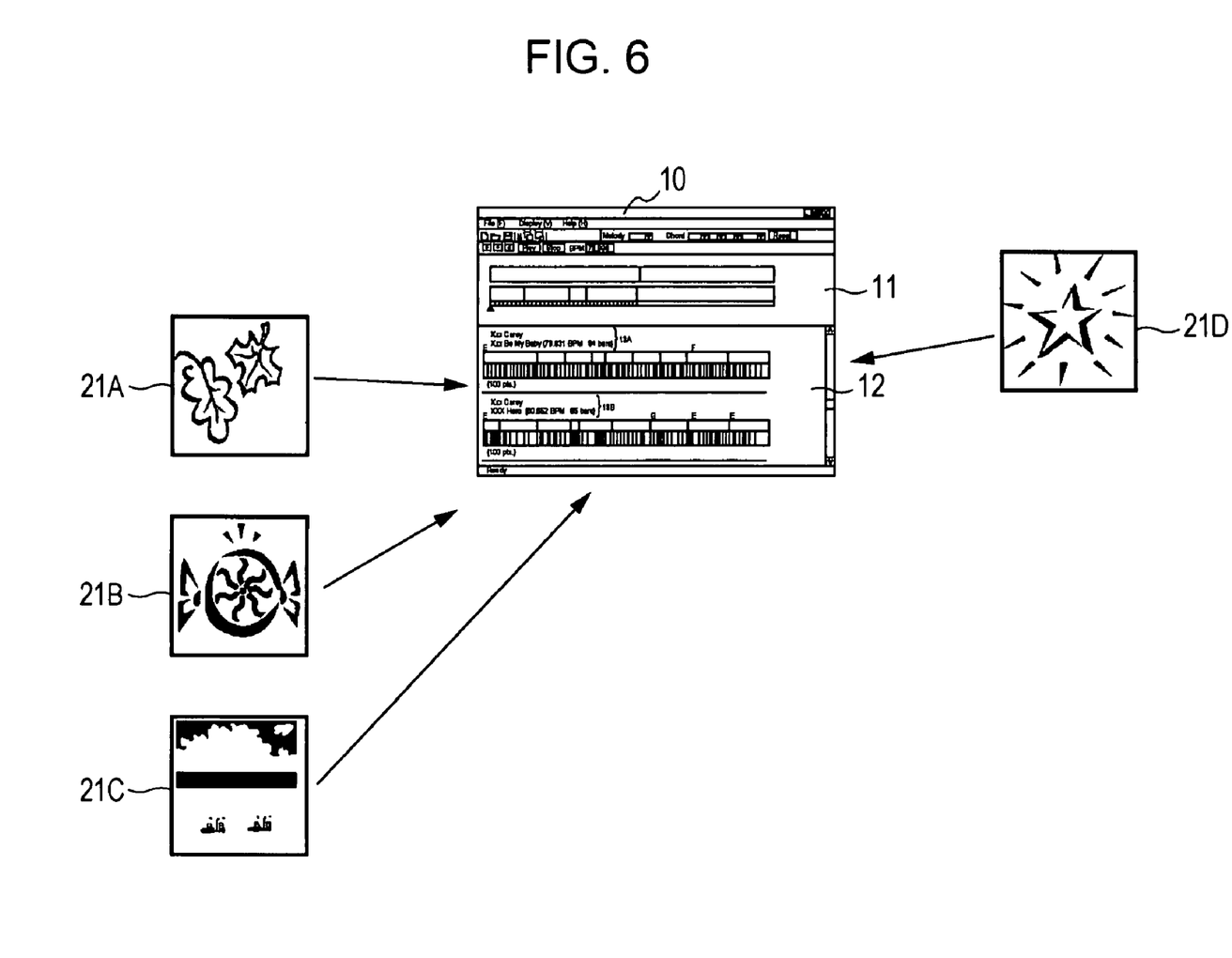
FIG. 6 is a diagram illustrating an example of use.

For example, as illustrated in FIG. 6, if mashup processing is performed using current hit music pieces 21A to 21C and a past music piece 21D, users can enjoy a new mashup music piece. Furthermore, according to this mashup system, the past music piece whose sales remain at a low level can attract attention again. Thus, the mashup system can contribute to sales.

Furthermore, special knowledge is not required for mashup processing. Still furthermore, a user can modify or develop a result of the mashup processing for the user's own use by processing the recipe.

[4] Data Structure in Recipe

Figure 7:
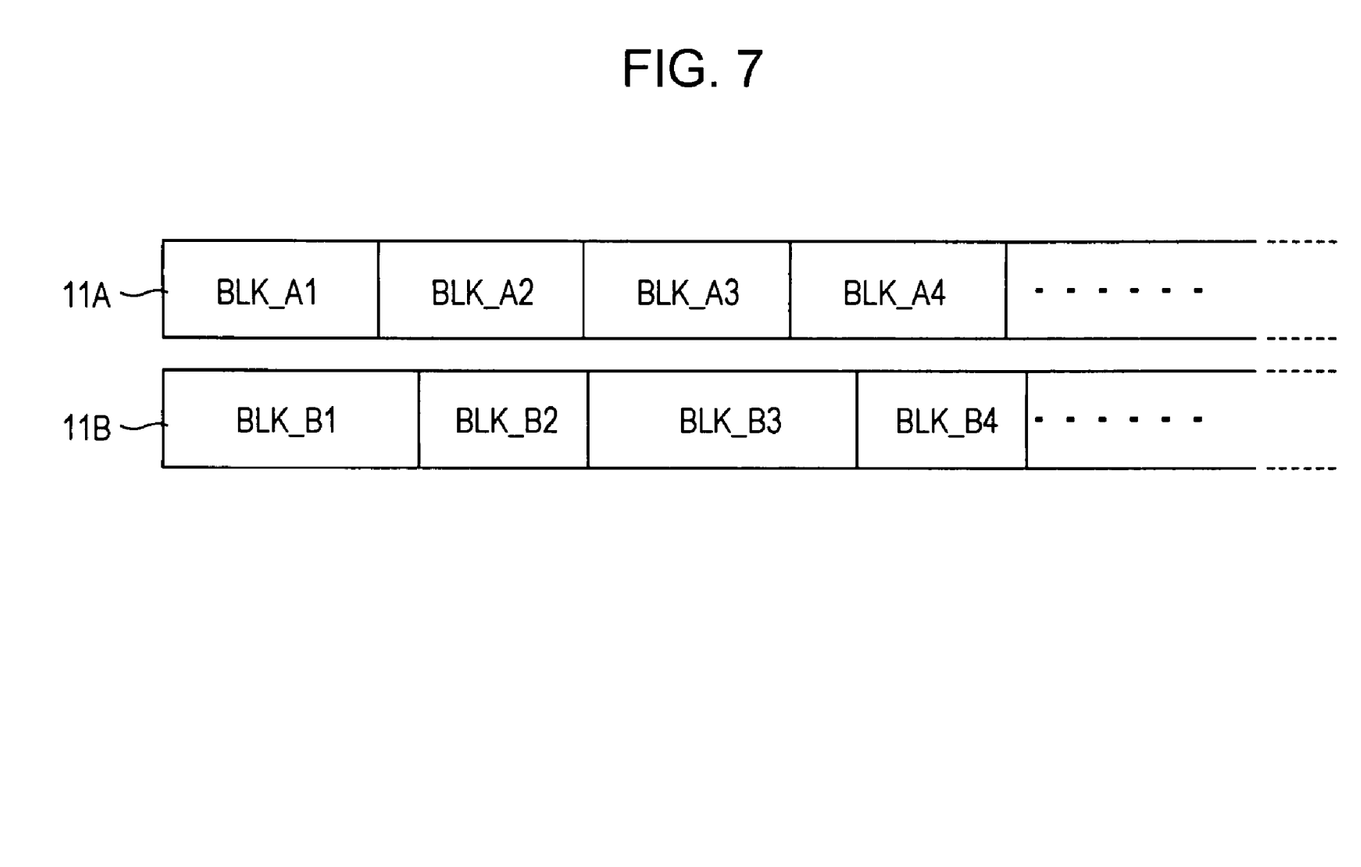
FIG. 7 is a diagram illustrating an example of a concept of data.

FIG. 7 is a diagram illustrating the concept of the tracks 11A and 11B illustrated in FIG. 3. The track 11A includes a plurality of blocks, BLK_A1, BLK_A2, BLK_A3, etc. obtained from mashup processing. The track 11B includes a plurality of blocks, BLK_B1, BLK_B2, BLK_B3, etc. obtained from mashup processing. As illustrated in FIG. 7, the lengths (time lengths) of these blocks differ from each other. The blocks are numbered in consecutive order, but it does not necessarily mean that the blocks are consecutive blocks in an original music piece.

Figure 8:
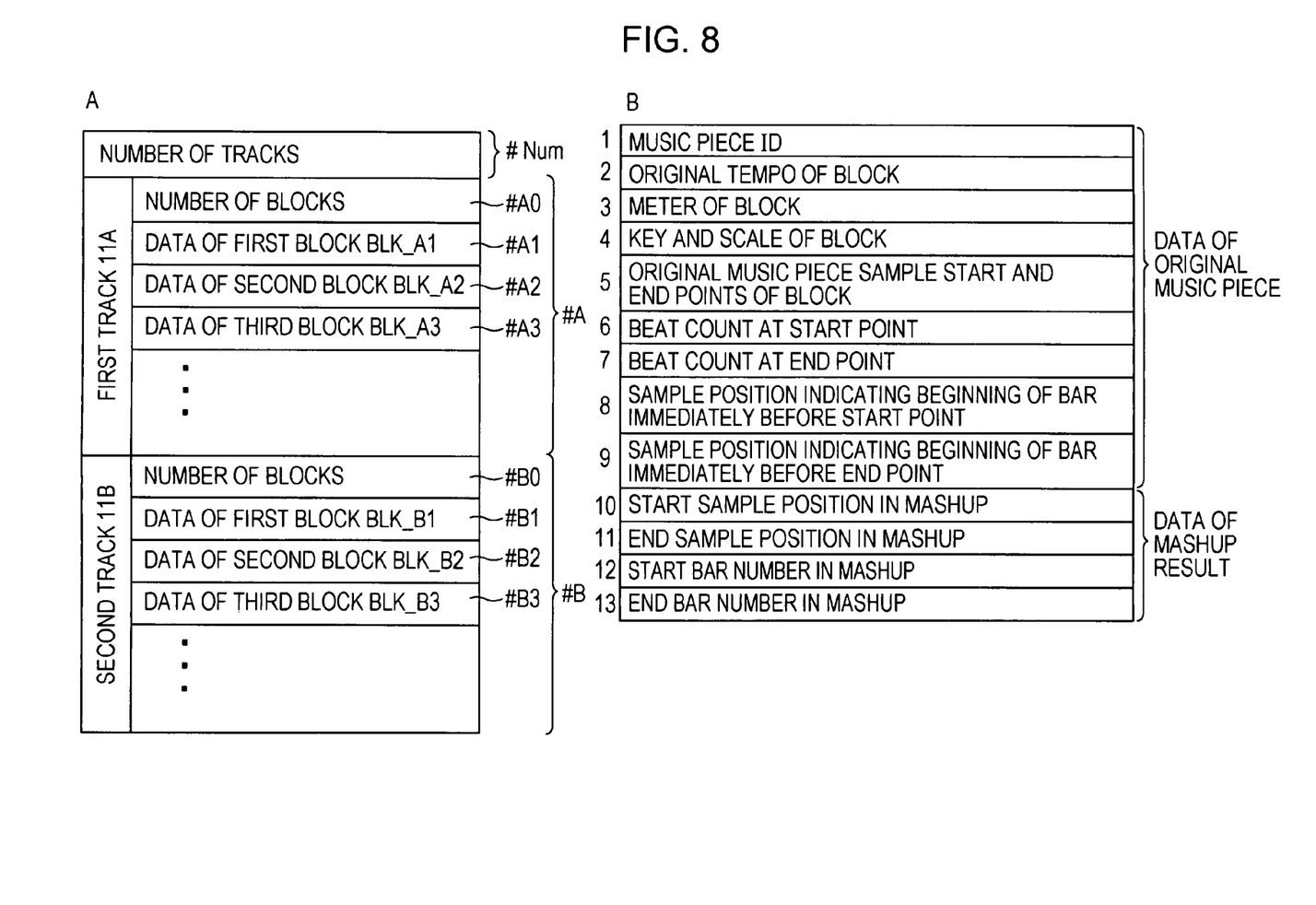
FIG. 8 is a diagram illustrating an example of a data table and exemplary contents of the data table.

The blocks included in the tracks 11A and 11B are specified in accordance with, for example, a recipe illustrated in FIG. 8. That is, as illustrated in FIG. 8A, a track table TRK-TBL is prepared. The track table TRKTBL includes a data area #NUM indicating the number of tracks such as the tracks 11A and 11B included in the upper area 11 of the display screen 10, a data area #A indicating pieces of information about blocks in the track 12A, and a data area #B indicating pieces of information about blocks in the track 12B.

In the case of the examples illustrated in FIGS. 1 to 3, the number of tracks indicated in the data area #NUM is two. Accordingly, the track table TRKTBL includes the data area #A for the first track 11A and the data area #B for the second track 11B.

The data area #A for the first track 11A includes a data field #A0 indicating the number of blocks included in the first track 11A and a data field #Ai indicating information about a block BLK_Ai (i=1, 2, . . . ) included in the first track 11A. Each of the data fields #A0 and #Ai stores corresponding pieces of data.

The data area #B for the second track 11B similarly includes a data field #B0 indicating the number of blocks included in the second track 11B and a data field #Bj indicating information about a block BLK_Bj (j=1, 2, . . . ) included in the second track 11B. Each of the data fields #B0 and #Bj stores corresponding pieces of data. If there are the third track and the subsequent tracks, a data area is similarly prepared for each track. The data area includes data fields each storing corresponding pieces of data.

For example, each of the data fields #Ai and #Bj in the data areas #A and #B stores pieces of data illustrated in FIG. 8B. That is, referring to FIG. 8B, pieces of data in the first to ninth lines are pieces of information about an original music piece to be used for mashup processing, and pieces of data in the remaining four lines are pieces of information about a mashup music piece that is a result of the mashup processing.

The "music piece ID" in the first line is an identification code used to identify an original music piece (in this case, the original music piece A or B). Furthermore, since the tempo of a music piece generally varies on a block-by-block basis, the "original tempo of block" indicates the tempo of a corresponding block of the original music piece and the "meter of block" indicates the meter of the corresponding block such as ½ or ¾.

Still furthermore, the "key and scale of block" indicates information to be used for modulation. Since it sometimes happens that an original music piece is used for mashup processing from the middle of a bar thereof or until the middle of a bar thereof, the "original music piece sample start and end points of block" indicates the use start and end points that are counted by sample unit in the original music piece. Furthermore, the "beat count at start point" and the "beat count at end point" indicate, using a bar and a beat, a position in the original music piece from which the corresponding block starts and a position in the original music piece at which the corresponding block ends, respectively (for example, the third beat in the tenth bar).

The "sample position indicating beginning of bar immediately before start point" indicates the position of the beginning of a bar immediately before a point from which the use of the original music piece is started for mashup processing, which is counted by sample unit in the original music piece. The "sample position indicating beginning of bar immediately after end point" indicates the position of the beginning of a bar immediately after a point at which the use of the original music piece is finished for mashup processing, which is counted by sample unit in the original music piece.

Accordingly, a user can know which part (which of blocks) of the original music piece is required for mashup processing by sample unit using the above-described pieces of information in the first to ninth lines.

Furthermore, referring to FIG. 8B, the "start sample position in mashup" and the "end sample position in mashup" indicate a boundary point between a certain block and the next block in a mashup music piece (see, for example, FIG. 7) that is a result of mashup processing, that is, indicate the start and end points of a certain block, respectively, which are counted by sample unit. The "start bar number in mashup" and the "end bar number in mashup" indicate the start and end bar numbers of a mashup music piece that is a result of mashup processing, respectively.

Accordingly, using the above-described pieces of information in the tenth to thirteenth lines, a user can know a structure used when mashup processing is performed using a block obtained from the original music piece.

Thus, by using the track table TRKTBL illustrated in FIG. 8, a user can extract blocks required for mashup processing from an original music piece on a sample-by-sample basis and combine the extracted blocks so as to create a new mashup music piece. That is, the track table TRKTBL can be used as a recipe.

[5] Example of Hardware

Figure 9:
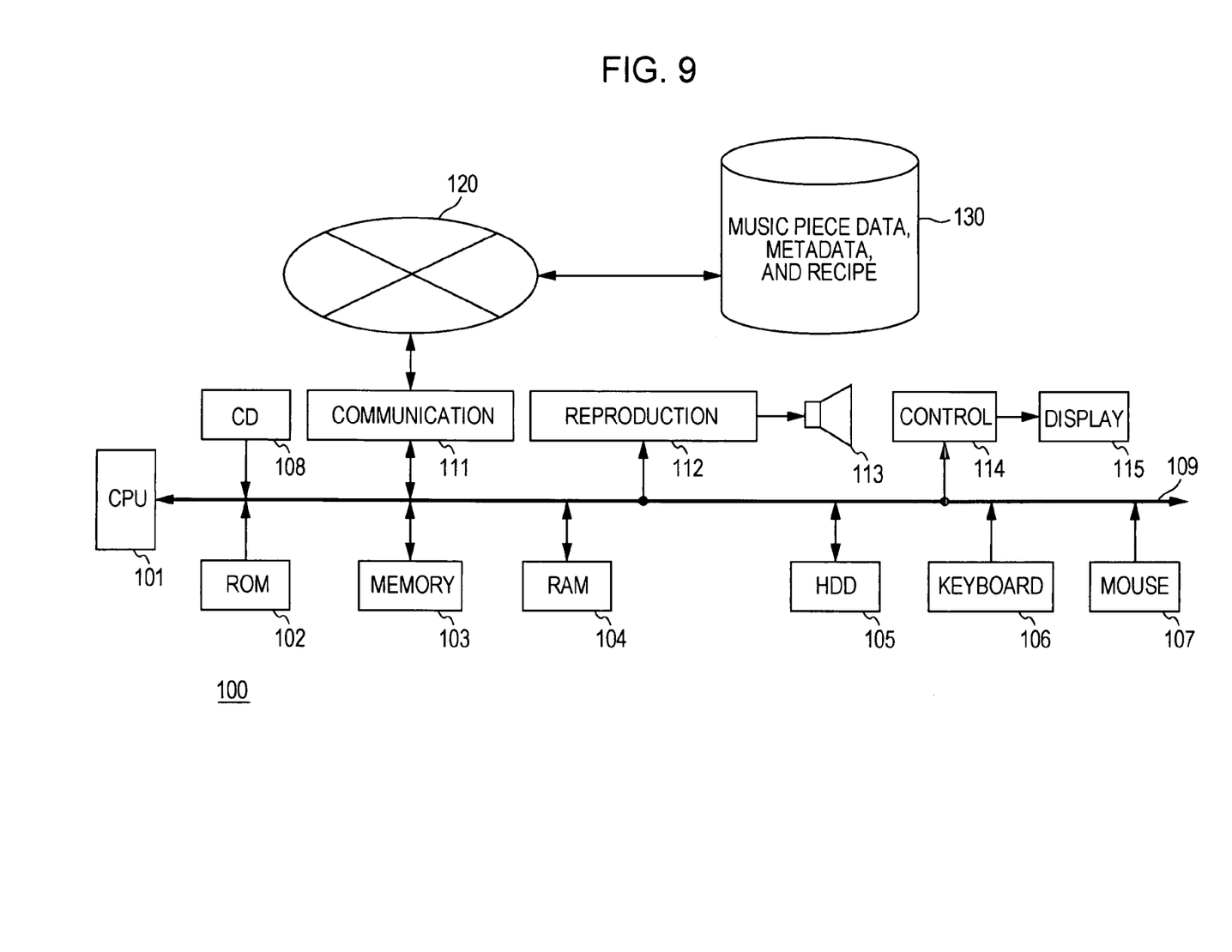
FIG. 9 is a diagram illustrating an example of a personal computer applying the present invention.

FIG. 9 illustrates an example of a case in which a personal computer performs the above-described mashup processing.

A personal computer 100 is configured in the same manner as a general personal computer, and has a CPU 101, a ROM 102, a nonvolatile memory 103, and a RAM 104.

In this case, the CPU 101 executes various programs, and each of the ROM 102 and the memory 103 stores a BIOS to be executed by the CPU 101 and basic data. The RAM 104 functions as a work area when the CPU 101 executes a program. These memories 102 to 104 are connected to the CPU 101 via a system bus 109.

Figure 10:
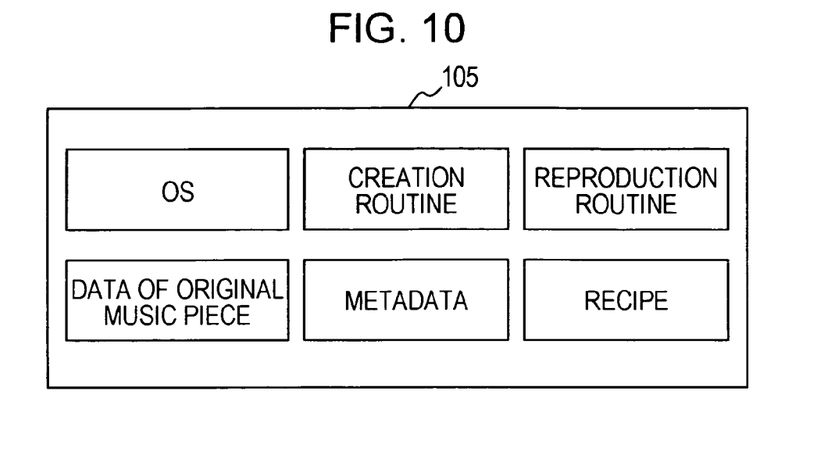
FIG. 10 is a diagram illustrating an example of data provided in a storage.

Furthermore, a hard disk drive 105 that is a large-capacity storage is connected to the system bus 109. In this case, as illustrated in FIG. 10, for example, the hard disk drive 105 stores an OS used to operate the personal computer 100, a routine for performing mashup processing, digital audio data of an original music piece (music piece) to be subjected to mashup processing, metadata of the original music piece, and data of a result of mashup processing, that is, the track table TRKTBL (recipe) described previously with reference to FIG. 8. The metadata includes general pieces of data of a corresponding music piece (a music piece ID, a music piece title, an artist name, etc.) and various pieces of data such as tempo data, key data, meter data, and chord data which are required for the creation of a recipe.

User interfaces such as a keyboard 106 functioning as character input means and a mouse 107 functioning as a pointing device and a CD drive device 108 functioning as external digital audio data input means are connected to the system bus 109.

Furthermore, a communication interface circuit 111 is connected to the system bus 109. The personal computer 100 is connected to an external network, for example, the Internet 120, via the communication interface circuit 111. The network 120 is connected to a server 130 storing the pieces of digital audio data and metadata of the above-described original music pieces.

For example, as illustrated in FIG. 10, the pieces of digital audio data and metadata of the original music pieces, which are stored in the server 130, are downloaded via the Internet 120 and the communication circuit 111, and are then stored in the hard disk drive 105. A personal computer or player having a configuration similar to that of the personal computer 100 may be connected to the network 120 as illustrated in FIG. 5.

The personal computer 100 also includes an audio reproduction circuit 112 and a display control circuit 114, and these circuits are also connected to the system bus 109. The audio reproduction circuit 112 receives digital audio data, performs decoding of the digital audio data in accordance with MP3 as appropriate, performs D/A conversion so as to convert the digital audio data into an analog audio signal, and supplies the analog audio signal to a speaker 113.

The display control circuit 114 includes a video RAM (not illustrated) to which display data is supplied. The display data is repeatedly read from the video RAM at a predetermined cycle, and is then converted into a video signal. The video signal is supplied to a display 115. The display 115 displays an image, for example, the image illustrated in FIG. 1, 2, or 3, on the basis of the supplied video signal.

[6] Example of Creation Routine

Figure 11:
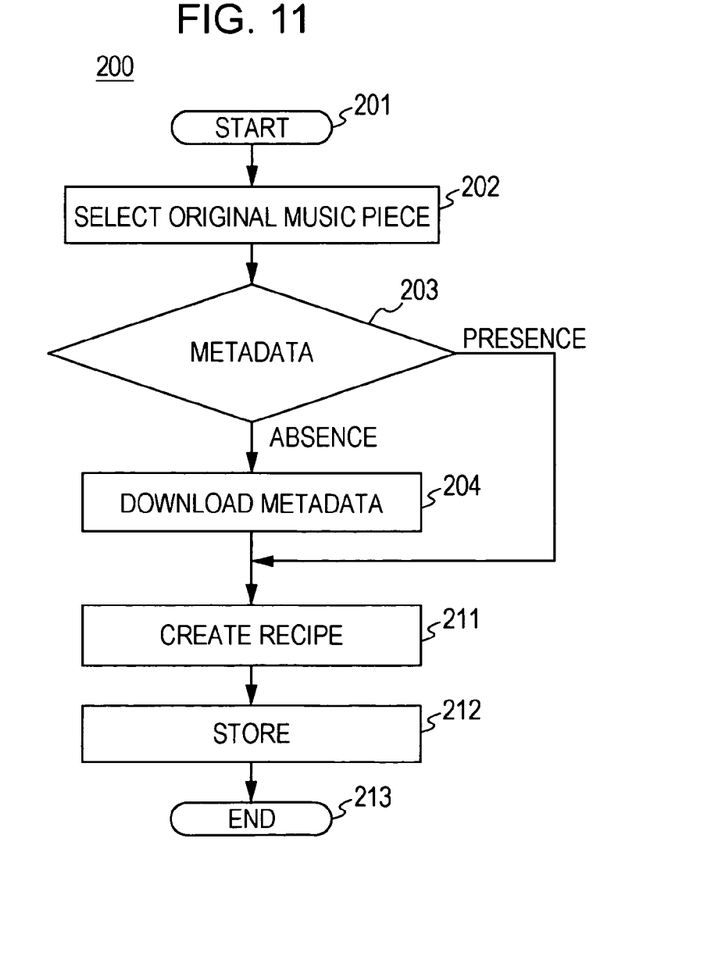
FIG. 11 is a flowchart illustrating an example of a mashup processing method.

Referring to FIG. 11, a reference numeral 200 indicates an example of a routine for creating a new music piece by performing mashup processing. As illustrated in FIG. 10, the creation routine 200 is provided in the hard disk drive 105. In FIG. 11, only a part of the routine 200 which is related to the present invention is illustrated.

In the following description, it is assumed that the digital audio data of an original music piece required for mashup processing is copied from a CD (not illustrated) by the CD drive device 108 and is then stored in the hard disk drive 105 in advance, or is downloaded from the server 130 by the communication circuit 111 and is then stored in the hard disk drive 105 in advance.

When mashup processing is performed, the CPU 101 executes the routine 200 as follows. That is, if a user provides an instruction for the execution of the routine 200 using the keyboard 106 or the mouse 107, the CPU 101 starts the routine 200 from step S201. Subsequently, in step 202, after various initial settings have been performed, an original music piece selection mode is set.

In this selection mode, for example, a list of titles of music pieces stored in the hard disk drive 105 is displayed. Accordingly, the user selects music pieces from among the music pieces as original music pieces to be used for mashup processing using the keyboard 106 or the mouse 107. For example, the user selects music pieces A and B.

Subsequently, in step S203, it is determined whether the pieces of metadata of the music pieces A and B selected in step S202 are stored in the hard disk drive 105. If it is determined that the pieces of metadata of the music pieces A and B are not stored in the hard disk drive 105, the process proceeds from step S203 to step S204. In step S204, the pieces of metadata of the music pieces A and B are downloaded from the server 130 and are then stored in the hard disk drive 105. Subsequently, the process proceeds to step S211.

If it is determined in step S203 that the pieces of metadata of the music pieces A and B selected in step S202 are stored in the hard disk drive 105, the process proceeds from step S203 to step S211.

Thus, the music pieces A and B to be used for mashup processing and the pieces of metadata of the music pieces A and B are prepared. Subsequently, in step S211, the procedures and processing operations which have been described in the above descriptions [1] and [2], that is, mashup processing, is executed. Consequently, for example, the track table TRKTBL illustrated in FIG. 8, that is, a recipe, is created.

In this case, the determination of where to locate a block of the original music piece A or B in the track 11A or 11B is performed in accordance with a user's instruction. Furthermore, while the mashup processing is being performed, the user can test-listen to a result of the mashup processing by clicking on the reproduction button 15P. Still furthermore, during the reproduction of a result of the mashup processing, the pointer 11P moves to indicate a reproduction position.

If the user clicks on the save button 17 after the mashup processing has been completed, the recipe created in step S211 is stored in the hard disk drive 105. Subsequently, in step S213, the routine 200 ends.

Thus, according to the routine 200, mashup processing can be performed so as to create a recipe.

[7] Another Example of Creation Routine

Figure 12:
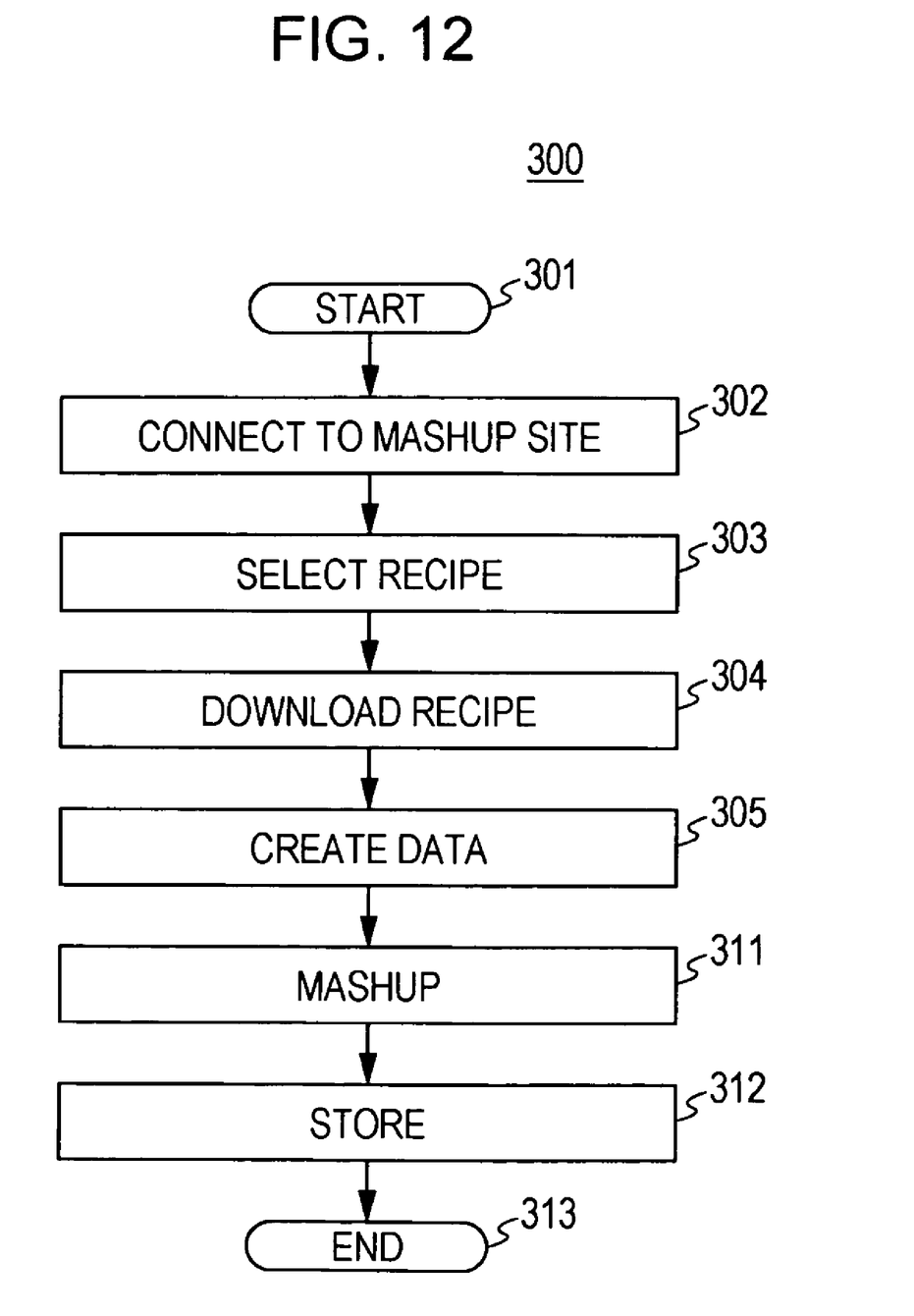
FIG. 12 is a flowchart illustrating another example of a mashup processing method.

Referring to FIG. 12, a reference numeral 300 represents another example of a routine for reproducing a new music piece by performing mashup processing. As illustrated in FIG. 10, the reproduction routine 300 is provided in the hard disk drive 105. In FIG. 12, only a part of the routine 300 which is related to the present invention is illustrated.

When mashup processing is performed, the CPU 101 executes the routine 300 as follows. That is, if a user provides an instruction for the execution of the routine 300 using the keyboard 106 or the mouse 107, the CPU 101 starts the routine 300 from step S301. Subsequently, in step 302, the personal computer 100 is connected to the server (site) 130 for mashup processing via the network 120.

Subsequently, in step S303, the pieces of digital audio data of music pieces to be used for mashup processing are selected. In step S304, a recipe for mashup processing (the track table TRKTBL) is selected. In step S305, the pieces of digital audio data of music pieces selected in step S303 and the recipe selected in step S304 are downloaded, and are then stored in the hard disk drive 105.

Thus, the music pieces A and B to be used for mashup processing and the recipe for the mashup processing are prepared. Subsequently, in step S311, the pieces of digital audio data of the Music pieces which have been downloaded in step S305 are mashed up in accordance with the recipe downloaded in step S305. By clicking on the reproduction button 15P, a result of the mashup processing is reproduced. Furthermore, if necessary, a user can change the result of mashup processing using the procedures or methods described in the descriptions [1] and [2].

If the user clicks on the save button 17 after the mashup processing has been completed, the created recipe is stored in the hard disk drive 105 in step S312. Subsequently, in step S313, the routine 300 ends.

Thus, according to the routine 300, a mashup music piece can be obtained. Furthermore, by additionally performing mashup processing, a recipe can be obtained.

[8] Preprocessing

In order to achieve the above-described mashup processing, it is generally required that the tempos, keys, and beat positions of the original music pieces A and B be the same. However, the tempos, keys, and beat positions of the music pieces A and B are often different from each other. Furthermore, in some cases, it is more effective to change the tempo and key of a mashup music piece that is a result of mashup processing.

Accordingly, the tempo and key of an original music piece is changed, and this change can be executed using a technique disclosed in Japanese Patent Application No. 2004-269085. That is, the tempo and meter of an original music piece can be detected from the sound level and peak sound of the original music piece. Tempo control is performed so that the beat start position (that is, the start position of a bar) of one of original music pieces or a desired mashup music piece that is a result of mashup processing and the beat start position of the other one of the original music pieces are the same. Furthermore, key control (modulation processing) is performed.

Figure 13:
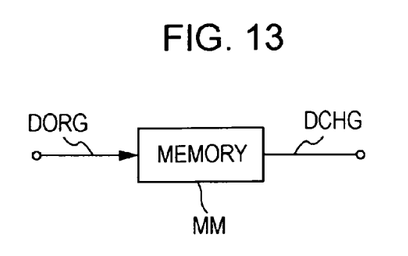
FIG. 13 is a schematic diagram illustrating an example of a preprocessing method.
Figure 14:
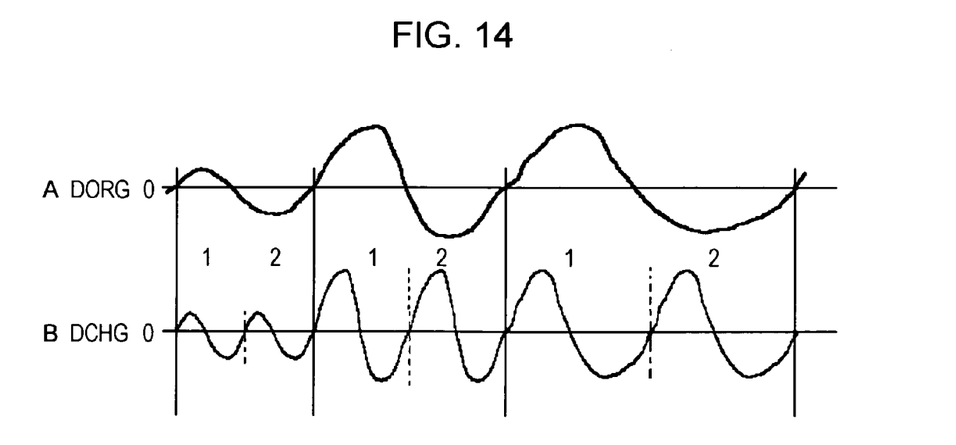
FIG. 14 is a waveform diagram illustrating an example of a preprocessing method.

As illustrated in FIGS. 13 and 14A, samples included in digital audio data DORG of an original music piece are sequentially written in a memory MM. Subsequently, as illustrated in FIG. 14B, the written samples included in the digital audio data DORG are decimated, for example, at a rate of one sample per two samples and the decimated samples are repeatedly read two times. Consequently, digital audio data DCHG including the read samples is obtained. In the digital audio data DCHG, a frequency of the original music piece becomes twice that of the original music piece in the digital audio data DORG. That is, the sound pitch of the original music piece in the digital audio data DCHG is one octave higher than that of the original music piece in the digital audio data DORG. Accordingly, by setting a decimation rate used when the digital audio data DCHG is read from the memory MM or the number of reading repetitions, a desired tempo and a desired key can be obtained.

[9] Conclusion

According to the above-described system, it is possible to perform mashup processing without special knowledge for mashup processing. By reprocessing a recipe or a result of mashup processing, it is further possible to modify or develop the result of mashup processing.

Furthermore, a recipe can be distributed among a plurality of players (users) via a storage medium, a P2P network, a server, a homepage, or the like. Users who have received the recipe can listen to a mashup music piece. In that case, users who will listen to the mashup music piece prepare the original music pieces A and B. The prepared original music pieces A and B are simply reproduced in accordance with the recipe. Accordingly, the possibility that the infringement of copyrights of the original music pieces A and B will occur is low. Conversely, this system can contribute to sales of the original music pieces A and B.

[10] Others

In the above-described description, it is assumed that the music piece A is a vocal solo and the music piece B is a musical scale played by various instruments using various chords. In this case, a musical accompaniment may be added to the music piece A. Alternatively, one of the music pieces A and B may be used as various types of effect sound. If the music piece B=the music piece A, that is, only the music piece A is selected, mashup processing can be performed using only blocks of the music piece A.

Furthermore, in the above-described description, a plurality of music pieces such as the music pieces A and B are mashed up. However, the present invention can be applied to the following cases: a case in which a plurality of pieces of contents, for example, a plurality of moving images, are mashed up; a case in which musical sound, a speech, and effect sound are added to a moving image; and a case in which a plurality of writings are mashed up. Furthermore, when mashup processing is performed, reverberation processing, echo processing, equalizer processing, etc. can be performed at the same time.

[List of Abbreviations]
    BIOS: Basic Input/Output System
    CD: Compact Disc
    CPU: Central Processing Unit
    D/A: Digital to Analog
    MP3: MPEG-1/Audio Layer 3
    MPEG: Motion Picture Experts Group
    OS: Operating System
    P2P: Peer to Peer
    RAM: Random Access Memory
    ROM: Read-Only Memory

The invention claimed is:

1. A mashup data file used for mashing up at least a first piece of content and a second piece of content, comprising:
    first data used for dividing each of the first piece of content and the second piece of content into a plurality of blocks in accordance with each piece of contents; and
    second data indicating a sequence for arranging the plurality of blocks to create a new piece of content,
    in which the first data includes for each block information indicative of a tempo, information usable for modulation, and information indicative of a bar and beat at a start point and at an end point.

2. The mashup data file according to claim 1, wherein each of the first piece of content and the second piece of content is a sound piece of content, an image piece of content, or a character piece of content.

3. The mashup data file according to claim 1, wherein the first piece of content and the second piece of content are the same.

4. A content creation method comprising:

mashing up a first piece of content and a second piece of content using first data used for dividing each of the first piece of content and the second piece of content into a plurality of blocks in accordance with each piece of contents and second data indicating a sequence for arranging the plurality of blocks to create a new piece of content, in which the first data includes for each block information indicative of a tempo, information usable for modulation, and information indicative of a bar and beat at a start point and at an end point.

5. A mashup apparatus for mashing up at least a first piece of content and a second piece of content comprising:

recording means for recording first data used for dividing each of the first piece of content and the second piece of content into a plurality of blocks in accordance with each piece of contents; and recording means for recording second data indicating a sequence for arranging the plurality of blocks to create a new piece of content, and wherein the first piece of content and the second piece of content are mashed up using the first data and the second data, and a result of mashup processing is output, and in which the first data includes for each block information indicative of a tempo, information usable for modulation, and information indicative of a bar and beat at a start point and at an end point.

* * * * *